United States Patent [19]

Thomson

[11] Patent Number: 5,296,930
[45] Date of Patent: Mar. 22, 1994

[54] NOISE REDUCTION PROCESSING DEVICE FOR VIDEO SIGNALS BY ARBITRATION OF PIXEL INTENSITIES

[75] Inventor: Richard C. Thomson, Edinburgh, United Kingdom

[73] Assignee: GEC Ferranti Defence Systems Limited, Middlesex, United Kingdom

[21] Appl. No.: 938,140

[22] PCT Filed: Dec. 3, 1991

[86] PCT No.: PCT/GB91/02144
§ 371 Date: Oct. 16, 1992
§ 102(e) Date: Oct. 16, 1992

[87] PCT Pub. No.: WO92/11733
PCT Pub. Date: Jul. 9, 1992

[30] Foreign Application Priority Data

Dec. 20, 1990 [GB] United Kingdom ............... 9027589

[51] Int. Cl.$^5$ ............................................. H04N 9/64
[52] U.S. Cl. .................................................. 348/607
[58] Field of Search ............... 358/167, 36, 166, 36, 358/160, 140; H04N 9/64

[56] References Cited

U.S. PATENT DOCUMENTS

| | | |
|---|---|---|
| 4,246,610 | 1/1981 | Takahashi . |
| 4,275,418 | 6/1981 | Trump . |
| 4,485,403 | 11/1984 | Illetschko . |
| 4,987,481 | 1/1991 | Spears et al. . |
| 4,987,489 | 1/1991 | Hurley et al. ............... 358/140 X |
| 5,148,278 | 9/1992 | Wischermann ............... 358/167 |

Primary Examiner—Victor R. Kostak
Attorney, Agent, or Firm—Spencer, Frank & Schneider

[57] ABSTRACT

The invention uses framestores for storing successive parts of three frames from the source of a video signal such as a camera, and a logical output selection unit arbitrates between the outputs for the frame to produce a reduced noise output to be fed to a T.V. monitor. If the noise of a pixel in the central frame is increased significantly compared to that in the first frame, the output of the third frame for that pixel is used to arbitrate between the two, for example, by selecting as the output that of the first frame if it is found that the output of the third frame is nearer to that of the first frame than to the second. Isolated noise specks are thereby reduced without the problems of motion smear.

9 Claims, 1 Drawing Sheet

NOISE REDUCTION PROCESSING DEVICE FOR VIDEO SIGNALS BY ARBITRATION OF PIXEL INTENSITIES

BACKGROUND OF THE INVENTION

A. Field of the Invention

This invention relates to a noise reduction processing device for video signals.

B. Description of Related Art

The invention is especially applicable to the use of image intensifiers for increasing the sensitivity of a television camera, which cause a noisy picture. The noise is in the form of a speckle pattern of bright white dots above the background picture, which greatly detracts from the visual quality of the intensified picture. The noise specks are typically very short duration (one frame) single point (about one pixel) events.

Typically to remove this noise, integration techniques are used. Many frames of the output are averaged until the noise peaks are significantly reduced compared to the signal level. However, such integration causes so-called motion smear i.e. blurring, in the case of movement of the camera or of the scene's contents.

SUMMARY OF THE INVENTION

The invention provides a noise reduction processing device for video signals, including a framestore device for receiving successive parts of three video frames in sequence, and a selection device for arbitrating between the outputs of the framestore device for all three video frames for each pixel in the event that the outputs of the framestore device for two video frames for that pixel represent an increase in intensity of at least one eighth of the range of pixel intensity values.

The selection enables localised intensifier noise to be masked without the disadvantages of motion smear by arbitrating between the outputs of the framestore device for all three frames for a pixel which suddenly increases in intensity and hence could represent noise.

The arbitration may be, in the case of a pixel increasing sharply in intensity from one frame to the next, by comparing the output for the third frame for that pixel with that of the other two, and ascertaining whether the output for the third frame is nearer to that for the first frame (of lower intensity), or to that for the second frame (of increased intensity). In the event that, for that pixel, the intensity has fallen back to a level similar to that of the first frame, then it can be assumed that the increased intensity was caused by noise, and the selection device can select the output for the first frame (or the third frame) as the noise reduced output.

The amount by which the intensity of a pixel must increase from one frame to the next in order for the arbitration procedure to be employed is arbitrary. Thus, the arbitration procedure may be employed for an increase in intensity of at least one eighth of the range of pixel intensity values, or at least one quarter, or one half of the range of pixel intensity values, as desired.

The sequence of video frames will usually be immediately succeeding frames, although a sequence omitting every other frame could be employed if desired.

BRIEF DESCRIPTION OF THE DRAWINGS

A noise reduction processing device constructed in accordance with the invention will now be described by way of example with reference to the accompanying drawings, in which.

DESCRIPTION OF THE PREFERRED EMBODIMENT

Figure 1:
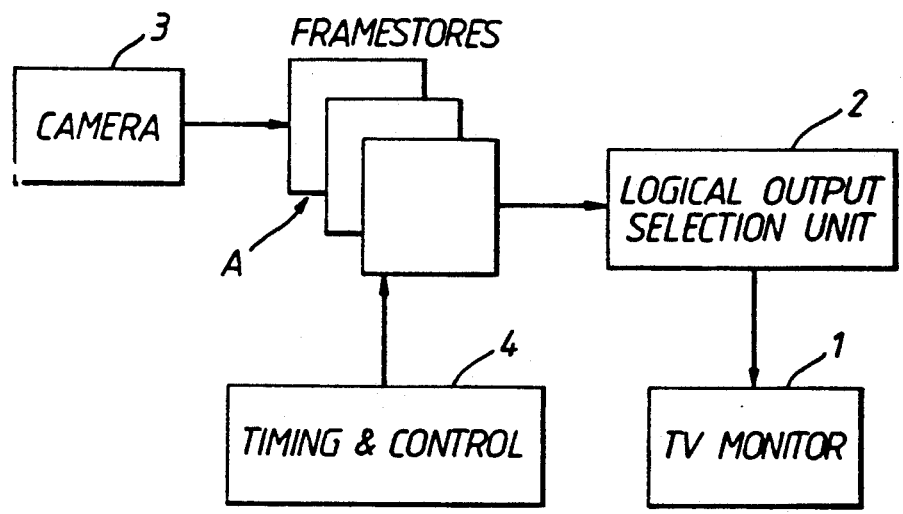
FIG. 1 is a schematic representation in block diagram form of the noise reduction processing device.

A T.V. monitor 1 receives an image from three framestores A selected by a logical output selection unit 2. Frames from a camera 3 are fed into the three framestores in rotation under the control of a timing and control unit 4.

Each framestore is able to store two interlaced fields. The timing and control unit addresses successive storage locations on a line by line basis so that the lines generated by the camera are stored accordingly. After a frame has been stored in one framestore, the next frame is stored in the next framestore, the next in the other framestore, and the next again in the first framestore, and so on.

The logical output selection unit 2 addresses corresponding storage locations in all three framestores, and passes a selected output from one of the three for each pixel to the T.V. monitor 1.

The frame held at any one time by the three framestores may be denoted the central frame, the preceding frame and the subsequent frame. In the event that the output of the framestore holding the central frame for a pixel represents an intensity approximately the same as or less than that represented by the output from the corresponding pixel of the framestore for the previous frame, then that output of the central framestore is fed to the T.V. monitor. The same applies to successive pixels in the line in question and for the successive lines. If, however, the selection unit detects that the output of the framestore holding the central frame for a pixel represents a significantly greater intensity than that represented by the output of the framestore holding the previous frame for the corresponding pixel, then this may be due to the effect of noise. In this case, the logical output selection unit 2 compares the output of the framestore holding the subsequent frame for that pixel with the corresponding outputs of the other two framestores. If the output of the framestore holding the subsequent frame is nearer to that of the framestore holding the preceding frame rather than the framestore holding the central frame, then it is assumed that the increased intensity of the central framestore represents a noise event and the output of the framestore holding the preceding frame of that pixel is selected instead as the output for that pixel to be passed to the T.V monitor. As an alternative, the output for the subsequent framestore for that pixel may be passed instead to the T.V. monitor or, indeed, the output of the central framestore for that pixel may simply be inverted, since the eye is much less sensitive to darker pixels than to whiter ones.

The same selection procedure is carried out for each pixel in turn as the picture is being read into the T.V. monitor.

If desired further framestores may be provided, and different arbitrations schemes may be employed.

Each framestore may be configured as a block of RAM typically arranged as a 768×576 array. Each pixel could have any one of 256 values on a grey scale (i.e. 8 bits of quantisation), so that in each clock cycle 8 bits are fed in, in parallel into each storage location.

As a suitable criteria for assessing whether a pixel in the central frame has a significantly greater intensity than that in the previous frame, one choice would be whether its intensity, as represented by the output of the two framestores, is 128 values greater than that of the previous framestore. Less severe assessments of significantly greater intensity could be used e.g. 56 values greater or 28 values greater and, so on. Indeed, the threshold for arbitration for could adaptive, i.e. different for dark areas than for light areas.

Figure 2:
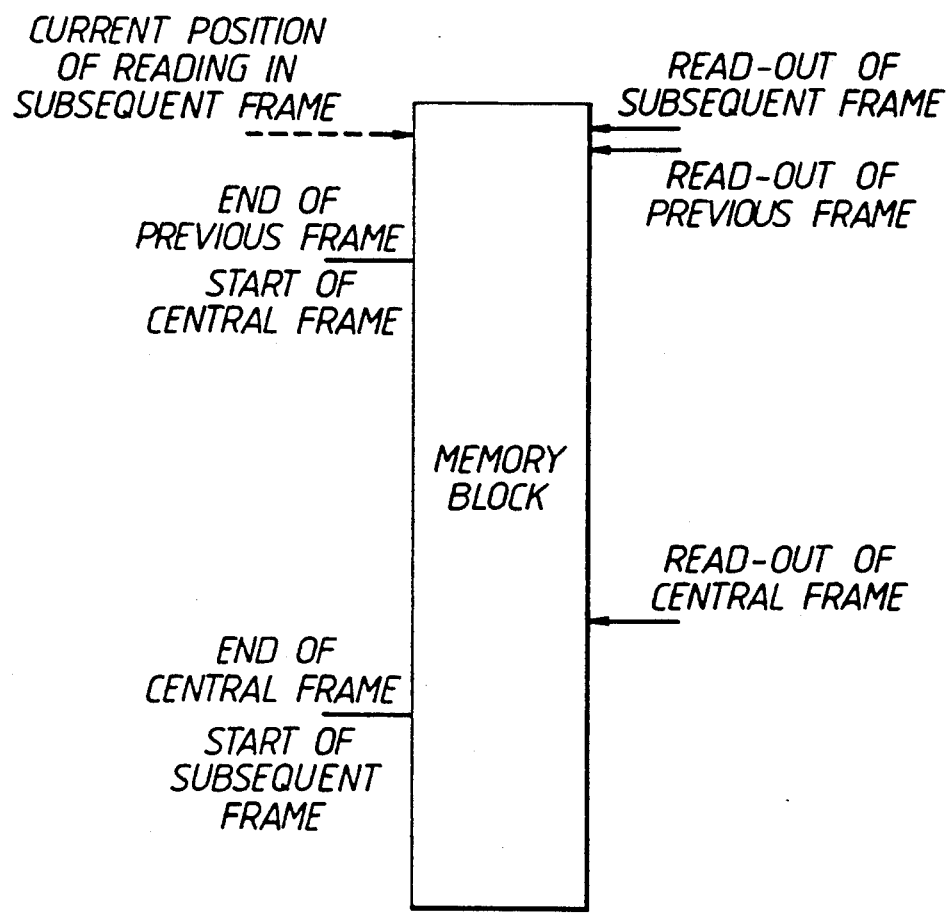
FIG. 2 is a schematic representation of a suitable implementation for the framestore.

It will be apparent that it is not necessary to store three complete frames simultaneously. This is because the first line of, say, the subsequent frame can be read out of its framestore shortly after reading it in, and can be simultaneously compared with the first line of the central frame and the first line of the previous frame. The same can be done for the second line and so on. Hence a single block of RAM can be used to store the successive lines of the three frames, and need be only just over two frames in storage capacity since as soon as a given line in the subsequent frame has been written in and read out (and compared with the corresponding line for the other two frames), that same line in the preceding frame has no further use and can be overwritten by the next line for the subsequent frame. Thus, referring to FIG. 2, successive lines for successive frames are written into the memory block in a notional cylindrical fashion, starting at line 1 after filling the last line, and only a little of the previous frame is retained at any one time.

The subsequent frame is read out at approximately the time it is read in, and the read out pointer for the subsequent frame is a little behind the read out pointer for the previous frame. The number of memory increments between the read out pointers remains fixed, but move continuously through the memory block in a notional cylindrical fashion.

The number of words required is typically greater than 2×768×576=884736K words so the memory block could be 1M×8 bits.

The pixels of each line are read out into shift registers.

The invention could be applied to colour, and framestores could be used for RGB, or R-Y or B-Y or other forms of coding.

The camera could be an image intensified camera e.g. an image intensified CCD, which are prone to the sort of single event (single pixel single frame) noise which the invention is especially suitable for removing, or the camera could have a silicon intensified target. However, the noise reduction processing device could be used to remove noise from all video signals whatever the origin e.g., R.F. T.V. signals received from an antenna (satellite T.V. receivers in marginal areas suffer from similar noise effects) or video signals in video tape recorders which at present produce so-called tadpole noise when suffering from drop-outs.

I claim:

1. A noise reduction processing device for video signals, comprising,
   framestore means for receiving successive pixels of first, second and third video frames in sequence, and
   selection means for arbitrating between an output of the framestore means for each respective pixel of the first, second and third video frames when the respective outputs of the framestore means for the first and second video frames for a particular pixel represent an increase in intensity from the first video frame to the second video frame of at least one eighth of a range of pixel intensity values by comparing a pixel intensity value for the particular pixel of the third video frame with a pixel intensity value for the particular pixel of the first video frame and with a pixel value for the particular pixel of the second video frame, and assessing whether the pixel intensity value for the particular pixel of the third video frame is nearer to the pixel intensity value for the particular pixel of the second video frame or nearer to the pixel intensity value for the particular pixel of the first video frame.

2. The noise reduction processing device as claimed in claim 1, wherein the selection means further selects a modified output for the particular pixel when the pixel intensity value for the particular pixel of the second video frame is nearer to the pixel intensity value for the particular pixel of the first video frame.

3. The noise reduction processing device as claimed in claim 2, wherein the modified output is the pixel intensity value for the particular pixel of the first video frame.

4. The noise reduction processing device as claimed in claim 2, wherein the modified output is the inverse of the pixel intensity level for the particular pixel of the second video frame.

5. A method of noise reduction for a video signal comprising the steps of:
   storing successive pixels of three video frames in sequence in a framestore; and
   arbitrating an output of the framestore for each pixel when respective pixel outputs of a first and a second video frame for a particular pixel represent an increase in intensity of the particular pixel of the first to the second video frame of at least one eighth of a range of pixel intensity values,
   the step of arbitrating including,
   comparing the output of the framestore for the particular pixel of a video frame subsequent to the second video frame with the output of the framestore for the particular pixel of the second video frame, and with the output of the framestore for the particular pixel of a video frame preceding the second video frame, and
   assessing whether the output for the particular pixel of the video frame subsequent to the second video frame has an intensity which is closer to the intensity of the particular pixel having the increased intensity or closer to the intensity of the particular pixel for the video frame preceding the second video frame.

6. A method for reducing noise in a video signal comprising the steps of:
   storing pixels of a first, second and third video frame in sequence in a framestore;
   outputting each pixel from the framestore;
   arbitrating between the output of two frames for a particular pixel in each frame when respective outputs of the framestore for the first and second video frames for the particular pixel represent an increase in intensity from the first video frame to the second video frame of at least one eighth of a range of pixel intensity values,
   the step of arbitrating including,
   comparing the output of the framestore for the particular pixel of the third video frame with the output of the framestore for the particular pixel of the first video frame, comparing the output of the framestore for the particular pixel of the third video frame with the output of the framestore for the particular pixel of the second video frame, assessing whether the output for the particular pixel of the third video frame represents an intensity that is closer to the intensity of the particular pixel of the second video frame or closer to the intensity of the particular pixel of the first video frame, and selecting an output from the framestore for the particular pixel based on the assessment of the relative intensities of the particular pixel of the respective video frames.

7. The method for reducing noise in a video signal according to the method of claim 6, wherein the step of selecting an output from the framestore includes selecting a modified output for the particular pixel when the intensity of the particular pixel of the second video frame is closer to the intensity of the particular pixel of the first video frame.

8. The method for reducing noise in a video signal according to the method of claim 7, wherein the modified output is the particular pixel of the first video frame.

9. The method for reducing noise in a video signal according to the method of claim 7, wherein the modified output is the inverse of the particular pixel of the second video frame.

* * * * *